United States Patent
Cao et al.

(10) Patent No.: US 11,710,148 B2
(45) Date of Patent: Jul. 25, 2023

(54) DEEP LEARNING-BASED REVENUE-PER-CLICK PREDICTION MODEL FRAMEWORK

(71) Applicant: Walmart Apollo, LLC, Bentonville, AR (US)

(72) Inventors: Xuan Cao, Santa Clara, CA (US); Lu Wang, Cupertino, CA (US); Wei Shen, Pleasanton, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 14 days.

(21) Appl. No.: 17/163,467

(22) Filed: Jan. 31, 2021

(65) Prior Publication Data
US 2022/0245670 A1 Aug. 4, 2022

(51) Int. Cl.
*G06N 3/04* (2023.01)
*G06Q 30/0242* (2023.01)
*G06Q 30/0241* (2023.01)
*G06N 3/08* (2023.01)

(52) U.S. Cl.
CPC ........... *G06Q 30/0247* (2013.01); *G06N 3/04* (2013.01); *G06N 3/08* (2013.01); *G06Q 30/0242* (2013.01)

(58) Field of Classification Search
CPC ........ G06Q 30/0247; G06N 3/04; G06N 3/08
See application file for complete search history.

(56) References Cited

U.S. PATENT DOCUMENTS

| 2012/0123863 A1 | 5/2012 | Kaul et al. |
| 2012/0130798 A1* | 5/2012 | Cooley ................. G06Q 30/02 |
| | | 705/14.41 |
| 2017/0262899 A1 | 9/2017 | Geraghty et al. |

(Continued)

FOREIGN PATENT DOCUMENTS

| CN | 109272356 | 1/2019 |
| CN | 110245987 | 9/2019 |

OTHER PUBLICATIONS

T Haylat. Introduction to Data Fusion. Medium.com. Jan. 29, 2020. [retrieved from internet on Apr. 9, 2022] <URL: https://medium.com/haileleol-tibebu/data-fusion-78e68e65b2d1> (Year: 2020).*

(Continued)

*Primary Examiner* — Bion A Shelden
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform extracting meta features for an item to generate sparse feature embeddings for the item; reducing, using a multilayer perceptron, a dimension of the sparse feature embeddings to generate a representation vector for the meta features; extracting, using a recurrent neural network, sequential data from dense traffic features for the item over a period of time; and inputting the representation vector for the meta features and the sequential data from the dense traffic features into a multilayer neural network with a rectified linear unit (ReLU) activation function and a scoring layer to generate one or more performance metrics for the item. Other embodiments are disclosed.

20 Claims, 5 Drawing Sheets

(56) References Cited

U.S. PATENT DOCUMENTS

| | | | |
|---|---|---|---|
| 2018/0300609 A1* | 10/2018 | Krishnamurthy | G06N 3/088 |
| 2018/0314944 A1 | 11/2018 | Li et al. | |
| 2019/0034994 A1* | 1/2019 | Wu | G06Q 30/0631 |
| 2019/0303980 A1 | 10/2019 | Yan et al. | |
| 2020/0285937 A1* | 9/2020 | Xu | G06N 3/0427 |
| 2021/0365965 A1* | 11/2021 | Shrivastava | G06N 3/088 |
| 2021/0366022 A1* | 11/2021 | Maldonado | G06Q 30/0643 |
| 2021/0397930 A1* | 12/2021 | Kulkarni | G06F 7/523 |

OTHER PUBLICATIONS

S. Sharma. Activation Functions in Neural Networks. Towards Data Science. Sep. 6, 2017. [retrieved from interneton Aug. 7, 2022] <URL: https://towardsdatascience.com/activation-functions-neural-networks-1cbd9f8d91d6> (Year: 2017).*

* cited by examiner

DEEP LEARNING-BASED REVENUE-PER-CLICK PREDICTION MODEL FRAMEWORK

TECHNICAL FIELD

This disclosure relates generally relates to a deep learning-based revenue-per-click prediction model framework.

BACKGROUND

Conventionally, performance prediction for web advertisements is based on historical traffic features. Such performance prediction generally does not take into account additional features and non-structural information about items.

BRIEF DESCRIPTION OF THE DRAWINGS

To facilitate further description of the embodiments, the following drawings are provided in which.

Figure 1:
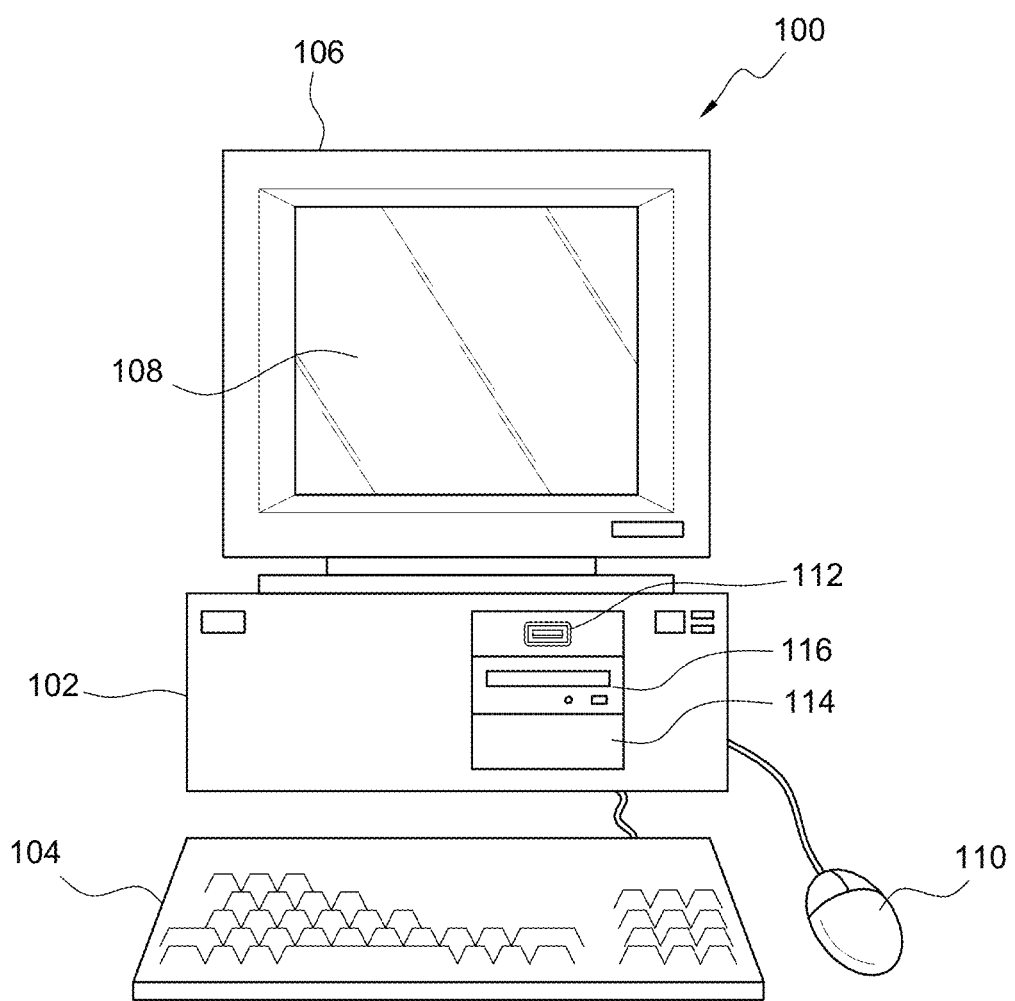
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 minute, 5 minutes, 10 minutes, or another suitable time delay period.

DESCRIPTION OF EXAMPLES OF EMBODIMENTS

Figure 2:
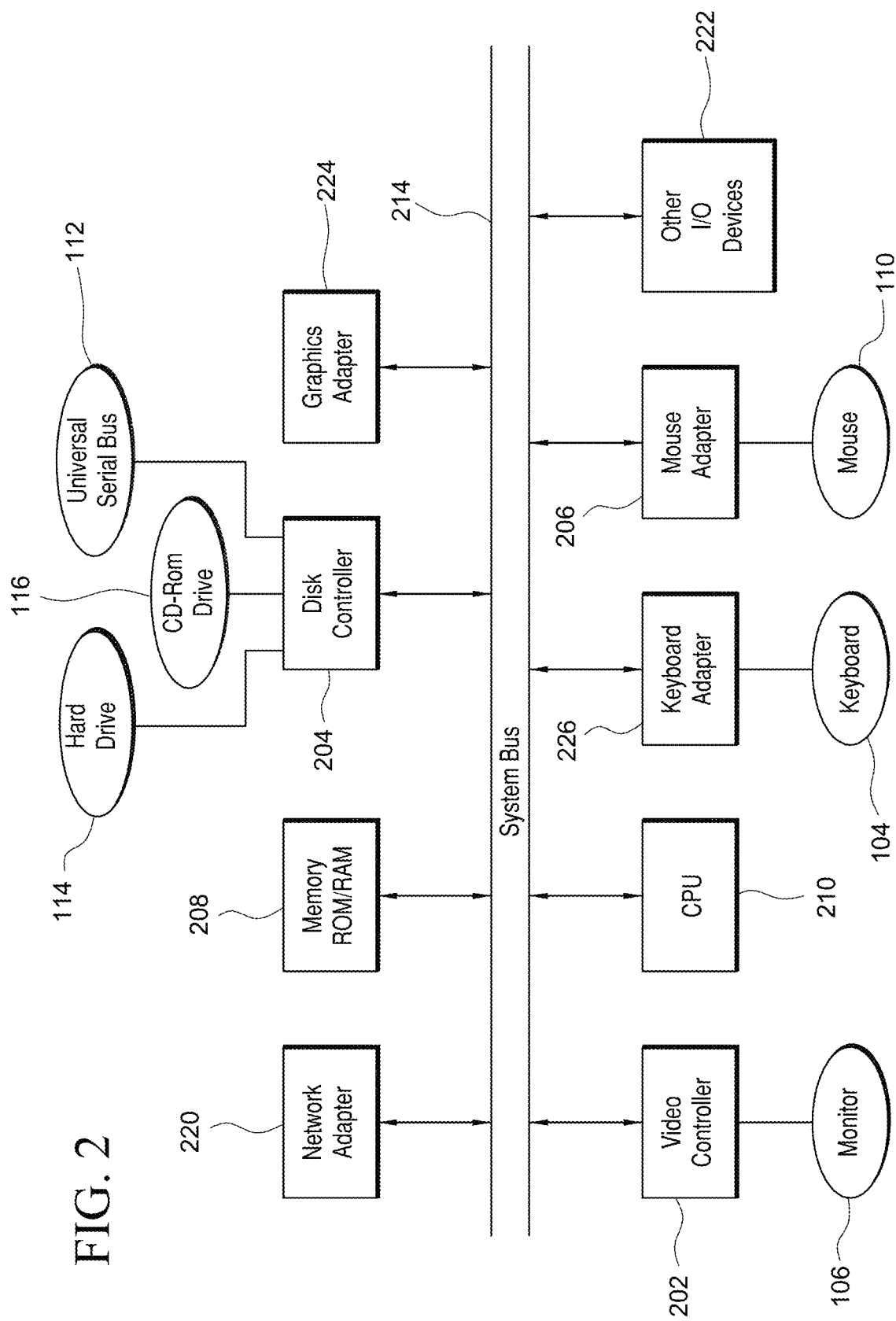
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
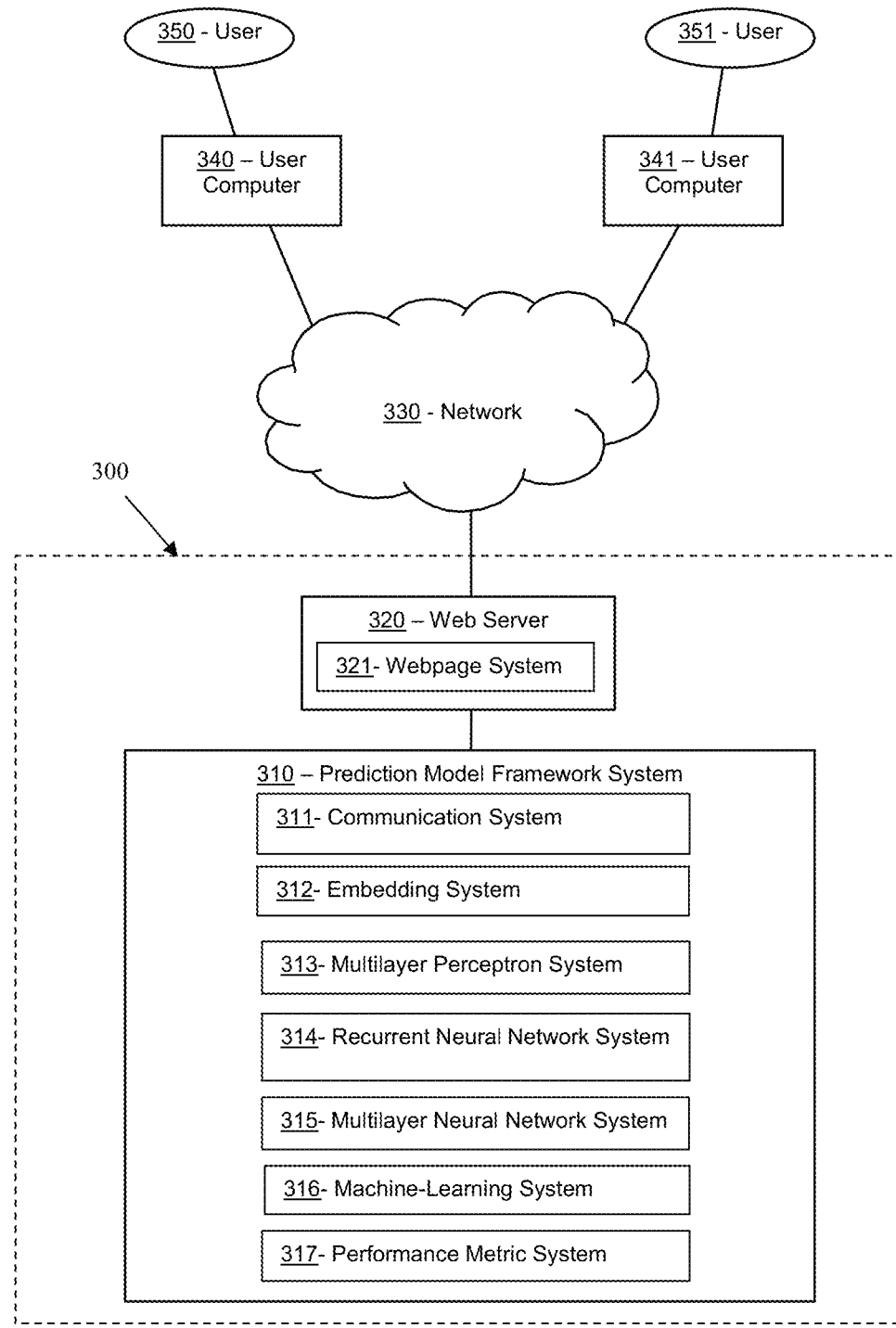
FIG. 3 illustrates a block diagram of a system that can be employed for a deep learning prediction model framework for an item, according to an embodiment.

Turning ahead in the drawings, FIG. 3 illustrates a block diagram of a system 300 that can be employed for a predicting performance metrics of an advertisement and/or an item, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a prediction model framework system 310 and/or a web server 320. Prediction model framework system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, prediction model framework system 310 and/or web server 320. Additional details regarding prediction model framework system 310 and/or web server 320 are described herein.

In a number of embodiments, each of prediction model framework system 310 and/or web server 320 can be a special-purpose computer programed specifically to perform specific functions not associated with a general-purpose computer, as described in greater detail below.

In some embodiments, web server 320 can be in data communication through Network 330 with one or more user computers, such as user computers 340 and/or 341. Network 330 can be a public network, a private network or a hybrid network. In some embodiments, user computers 340-341 can be used by users, such as users 350 and 351, which also can be referred to as associates, employees, data scientists, customers, in which case, user computers 340 and 341 can be referred to as associate computers. In many embodiments, web server 320 can host one or more sites (e.g., websites) that allow users to browse and/or search for items (e.g., products), to add items to a catalog, and/or to order (e.g., purchase) items, in addition to other suitable activities.

In some embodiments, an internal network that is not open to the public can be used for communications between prediction model framework system 310 and/or web server 320 within system 300. Accordingly, in some embodiments, prediction model framework system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

In many embodiments, prediction model framework system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to prediction model framework system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of prediction model framework system 310 and/or web server 320. In a similar manner, the processors and/or the non-transitory computer-readable media can be local and/or remote to each other.

Meanwhile, in many embodiments, prediction model framework system 310 and/or web server 320 also can be configured to communicate with and/or include one or more databases and/or other suitable databases. The one or more databases can include an item database that contains information about items or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between prediction model framework system 310, web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
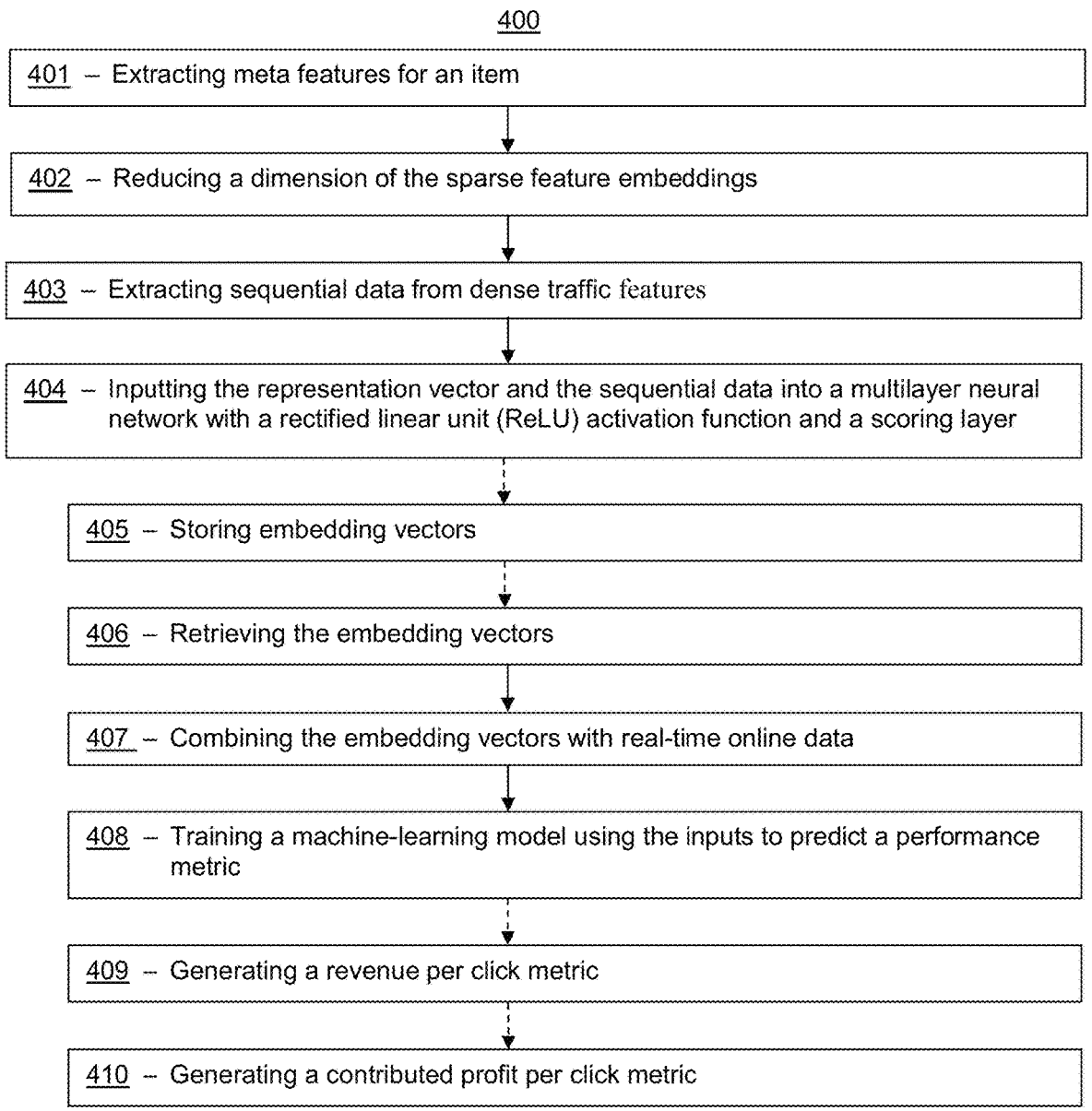
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically predicting performance metrics for an item. In several embodiments, determining more than one performance metric for an item can be implemented based on a multilayer neural network. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as prediction model framework system 310 (FIG. 3) and/or web server 320 (FIG. 3). The processor(s) can be similar or identical to the processor(s) described above with respect to computer system 100 (FIG. 1).

Referring to FIG. 4, method 400 can include a block 401 of extracting meta features for an item to generate sparse feature embeddings for the item. In some embodiments, meta features can be non-structural information, such as such as item-type information, item price, item hierarchy information, item description, item title, item images, static data about the item, and/or other suitable information about the item. In many embodiments, extracting meta features can be one of two feature towers utilized in the deep-learning framework.

In several embodiments, block 401 can include encoding hierarchy information about the item. In some embodiments, the hierarchy information for an item can include item type hierarchy information from an online catalog, such as taxonomy information.

In various embodiments, block 401 can include using an NLP-based embedding algorithm to embed text features about the item. In several embodiments, the text features can include an advertisement for the item, a title of the item, a description of the item, and/or another suitable text features.

NLP-based embedding techniques used to embed text features can include TF-IDF (term frequency-inverse document frequency), word2vec, deep-learning transformers, and/or another suitable embedding technique.

In a number of embodiments, block 401 can include extracting data from one or more images of the item using a convolutional neural network (CNN). In some embodiments, a pre-trained convolutional neural network can be used to extract image features from the images.

In some embodiments, method 400 also can include a block 402 of reducing, using a multilayer perceptron, a dimension of the sparse feature embeddings to generate a representation vector for the meta features. In several embodiments, the encoded hierarchy features, the embedding text features, and/or the pretrained CNN for image features can be concatenated and fed into the multilayer perceptron to reduce dimensions from sparse data to dense data. In various embodiments, all non-traffic extracted features can be concatenated and fed into the multilayer perceptron to generate a representation vector for the static features for the item. In some embodiments, the output from the multilayer perceptron can be used as input into the multilayer neural network with a rectified linear unit (ReLU), as described below in block 404.

In several embodiments, method 400 additionally can include a block 403 of extracting, using a recurrent neural network, sequential data from dense traffic features for the item over a period of time. In many embodiments, extracting dense features can be one of two feature towers utilized in the deep-learning framework. In some embodiments, along with the output from the perceptron, the output from the recurrent neural network also can be used as input into the multilayer neural network with a rectified linear unit (ReLU), as described below in block 404. In some embodiments, block 403 can be performed before, after, or concurrently with (e.g., in parallel with) block 401 and/or block 402.

In various embodiments, method 400 further can include a block 404 of inputting the representation vector for the meta features and the sequential data from the dense traffic features into a multilayer neural network with a rectified linear unit (ReLU) activation function and a scoring layer to generate one or more performance metrics for the item. In some embodiments, the outputs from the multilayer perceptron in block 402 and the recurrent neural network in block 403 can be combined in preparation to input the combined data into the multilayer neural network with the ReLU activation function. In various embodiments, the scoring layer can generate predictions of performance metrics, such as conversion rate (convrt), order size, and/or contributed profit per order (CP/order). In some embodiments, the individual outputs can be intermediate metrics used to create other predictions that can have business value, such as:

RPC(revenue per click)=(conversion rate)*(order size)

CPPC(CP per click)=(conversion rate)*(CP/order)

In several embodiments, the prediction model framework in blocks 401-404 can be used for an offline learning service and/or as an online learning service. In some embodiments, the output of the multilayer neural network with the second ReLU layer can be used for both the offline learning service and the online learning service.

In various embodiments, the output layer from the second ReLU layer can generate an embedding vector which can represent a combination of the historical performance data for both the dense traffic features and the extracted non-structural meta features. In several embodiments, this embedding vector can be pre-computed offline and retrieved in near-real time (NRT) for use in an online learning service.

In some embodiments, method 400 also and optionally can include a block 405 of storing embedding vectors generated by the multilayer neural network. For example, the embedding vectors can be generated offline and stored in a database to be used by the online service. In a number of embodiments, the embedding vectors can be embedding vectors generated by the second ReLU layer.

In various embodiments, method 400 further and optionally can include a block 406 of retrieving the embedding vectors. For example, the online service can retrieve the embedding vectors stored in block 405.

In several embodiments, method 400 also can include, after block 406, a block 407 of combining the embedding vectors with real-time online data for the item to generate inputs. In some embodiments, an advantage of the online learning service can include allowing the system to adjust or modify the prediction metrics of the item based on a real-time data stream while the offline learning approach uses data from sparse features and dense features.

In a number of embodiments, method 400 further can include, after block 407, a block 408 of training a machine-learning model using the inputs to predict a performance metric for the item. In several embodiments, by combining the embedding vector and the near-real-time data, the online learning service can train a light-weight machine-learning model (e.g., a linear-regression model) in real-time to predict the same performance metrics (e.g. convert, ordersize, CP/order) as in the offline learning service.

In some embodiments, method 400 additionally and optionally can include a block 409 of generating a revenue per click metric based on the conversion rate and the order size.

In various embodiments, method 400 also can include a block 410 of generating a contributed profit per click metric based on the conversion rate and the contributed profit per order.

Figure 5:
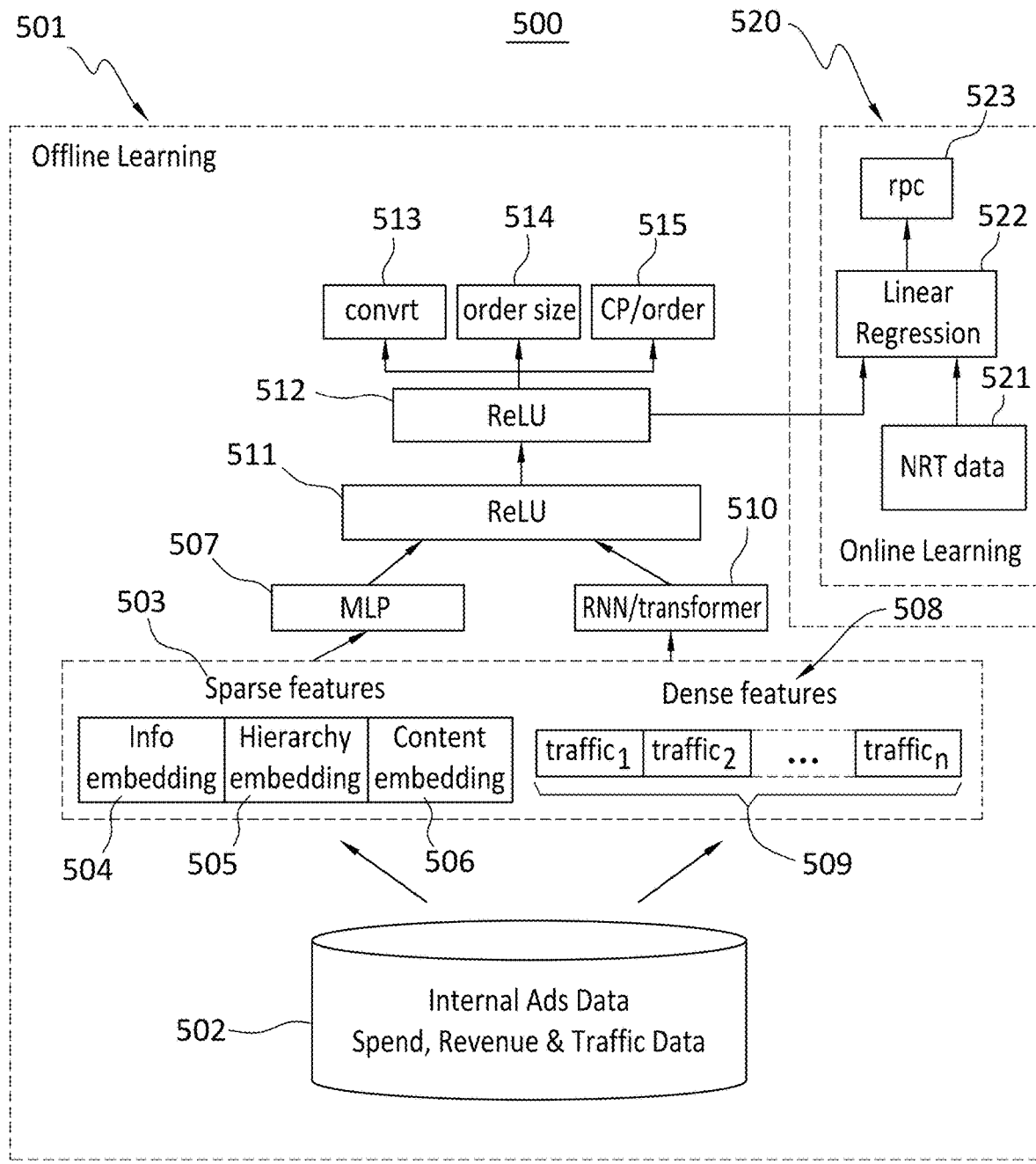
FIG. 5 illustrates a flow chart diagram for a method of automatic prediction of performance metrics for an item, according to another embodiment of FIG. 3.

Turning ahead in the drawings, FIG. 5 illustrates a flow chart diagram for a method 500, according to another embodiment. Method 500 can be an end-to-end deep-learning framework with automatic feature extraction based on two feature extraction towers in the framework. Method 500 can include an offline learning model 501 and an online learning model 520, which can be used to generate performance metrics for an item, such as RPC. Method 500 can be similar or identical to method 400 (FIG. 4). Method 500 can be employed in many different embodiments and/or examples not specifically depicted or described herein. In some embodiments, the procedures, the processes, and/or the activities of method 500 can be performed in the order presented or in parallel. In other embodiments, the procedures, the processes, and/or activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as prediction model framework system 310 (FIG. 3) and/or web server 320 (FIG. 3). The processor(s) can be similar or identical to the processor(s) described above with respect to computer system 100 (FIG. 1).

In several embodiments, method 500 can include offline learning model 501 and online learning model 520, which each can generate a set of performance metrics of an item. Such key revenue metrics can include a conversion rate metric 513, an order size metric 514, a contributed profit (CP) per order metric 515, a revenue per click (RPC) metric 523, and/or other suitable performance metrics.

In some embodiments, offline learning model 501 can include two feature extraction towers in the framework, including meta features tower 503 and dense traffic features tower 508. Meta features tower 503 can extract sparse features (e.g., price, hierarchy information, description, and images) of an item from data 502 (e.g., internal ads data, ad spend data, revenue, traffic data). Such sparse features can include embedding data 504 (embedding text features), embedding data 505 (encoded hierarchy features), and embedding data 506 (image features, transformed using a convolutional neural network). Such sparse features can be concatenated and fed as input into a multilayer perceptron (MLP) 507 to further reduce dimension (sparse to dense).

In several embodiments, dense features tower 508 also can extract dense traffic features 509 (e.g., click, revenue, spend, etc.) for an item from data 502, such as traffic data. A recurrent neural network (RNN) 510 and/or transformers can extract the historical traffic sequential information, or the traffic data can be used directly.

In various embodiments, output from MLP 507 and RNN 510 can be concatenated and input into multiple layers of Rectified Linear Units, such as a first ReLU layer 511 and a second ReLU layer 512, to output metrics at a scoring layer including conversion rate metric 513, order size metric 514, and/or CP per order metric 515

In several embodiments, online learning model 520 can retrieve and re-purpose the output of second ReLU layer 512 to be fed into a simplified scoring layer, such as linear-regression model 522 (e.g., machine-learning model) along with a Near Real Time (NRT) data stream 521. In some embodiments, the online learning model 520 can use the outputs of linear regression 522 and NRT data stream 521 to generate output performance metrics, such as RPC 523, or other performance metrics. In various embodiments, an advantage of online learning model 520 over offline learning model 501 can be shown by the system being able to modify or adjust predictions for a performance metric using NRT data stream 521.

Turning back in the drawings, FIG. 3 illustrates a block diagram of prediction model framework system 310. Prediction model framework system 310 is merely exemplary and is not limited to the embodiments presented herein. Prediction model framework system 310 can be employed in many different embodiments or examples not specifically depicted or described herein. In some embodiments, certain elements or systems of prediction model framework system 310 can perform various procedures, processes, and/or acts. In other embodiments, the procedures, processes, and/or acts can be performed by other suitable elements or systems. In many embodiments, the systems of prediction model framework system 310 can be modules of computing instructions (e.g., software modules) stored at non-transitory computer readable media. In other embodiments, the systems of prediction model framework system 310 can be implemented in hardware.

In many embodiments, prediction model framework system 310 can include a communication system 311. In a number of embodiments, communication system 311 can at least partially perform block 401 (FIG. 4) of extracting meta features for an item to generate sparse feature embeddings for the item, receiving data 502 (FIG. 5), and/or receiving data 521 (FIG. 5).

In several embodiments, prediction model framework system 310 also can include an embedding system 312. In various embodiments, embedding system 312 can at least partially perform block 401 (FIG. 4) of extracting meta features for an item to generate sparse feature embeddings for the item, block 405 (FIG. 4) of storing embedding vectors generated by the multilayer neural network, block 406 (FIG. 4) of retrieving the embedding vectors, block 407 (FIG. 4) of combining the embedding vector with real-time online data for the item to generate inputs, meta features tower 503 (FIG. 5) generating embedding data 504-506 (FIG. 5), and/or dense features tower 508 (FIG. 5) generating dense traffic features 509 (FIG. 5).

In many embodiments, prediction model framework system 310 further can include a multilayer perceptron system 313. In several embodiments, multilayer perceptron system 313 can at least partially perform block 402 (FIG. 4) of reducing, using a multilayer perceptron, a dimension of the sparse feature embeddings to generate a representation vector for the meta features and/or using MLP 507 (FIG. 5).

In some embodiments, prediction model framework system 310 additionally can include a recurring neural network system 314. In many embodiments, recurring neural network system 314 can at least partially perform block 403 (FIG. 4) of extracting, using a recurrent neural network, sequential data from dense traffic features for the item over a period of time and/or using RNN 510 (FIG. 5).

In various embodiments, prediction model framework system 310 also can include a multilayer neural network system 315. In some embodiments, multilayer neural network system 315 can at least partially perform block 404 (FIG. 4) of inputting the representation vector for the meta features and the sequential data from the dense traffic features into a multilayer neural network with a rectified linear unit (ReLU) activation function and a scoring layer to generate one or more performance metrics for the item, using first ReLU layer 511 (FIG. 5), and/or using second ReLU layer 512 (FIG. 5).

In a number of embodiments, prediction model framework system 310 further can include a machine-learning system 316. In some embodiments, machine-learning system 316 can at least partially perform block 408 (FIG. 4) of training a machine-learning model using the inputs to predict a performance metric for the item and/or using linear-regression model 522 (FIG. 5).

In several embodiments, prediction model framework system 310 additionally can include a performance metric system 317. In various embodiments, performance metric system 317 can at least partially perform block 409 (FIG. 4) of generating a revenue per click metric based on the conversion rate and the order size, block 410 (FIG. 4) of generating a contributed profit per click metric based on the conversion rate and the contributed profit per order, and/or generating conversion rate metric 513 (FIG. 5), order size metric 514 (FIG. 5), CP per order metric 515 (FIG. 5) and/or RPC 523 (FIG. 5).

In several embodiments, web server 320 can include a webpage system 321. Webpage system 321 can at least partially perform sending instructions to user computers (e.g., 340-341 (FIG. 3)) based on information received from communication system 311.

In some embodiments, the prediction model framework described herein can advantageously provide an end-to-end deep-learning framework with automatic feature extraction and high extensibility. For example, the deep learning-based RPC (revenue per click) prediction model framework described herein can improve online advertisements (ads) bidding performance and prediction. In various embodiments, prediction model framework system 310 (FIG. 3) can provide several advantages over conventional prediction frameworks. In some embodiments, advantages can include an improvement of RPC predictions for performance metrics of an item (increased accuracy), an increase in prediction coverage for advertisements, and a flexible and extendable framework to address the performance of advertisements viewed by users over conventional methods.

Historically, advertisement (ads) performance predictions relied mostly on historical traffic features. In some embodiments, another advantage of the prediction model framework can be shown by an expand feature space to cover other non-structural information, such as product type information, product hierarchy information, ads title, images in ads, and/or item description information. In several embodiments, conventional machine-learning models could not utilize the non-structural information directly. In many embodiments, another advantage of the prediction model framework system can be shown by the user of feature extractors to accommodate different types and formats of features.

In many embodiments, the techniques described herein can provide several technological improvements. In some embodiments, the techniques described herein can provide for automatically determining performance metrics for an item using a prediction model framework system. In many embodiments, the techniques described herein can beneficially make predictions based on real-time data streams that describe current item information.

In a number of embodiments, the techniques described herein can advantageously provide a consistent user experience by dynamically updating performance metrics of items, such as prediction model framework system 310 (FIG. 3) across different applications that query this information. For example, over two million product updates and advertisements can be viewed from users in one day. In some embodiments, the techniques provided herein can beneficially reduce computing resources and costs while continuing to offer real time updates for item performance received each second, minute, and/or other suitable period of time in at least a day, a week, and/or other suitable periods of time.

In many embodiments, the techniques described herein can be used continuously at a scale that cannot be handled using manual techniques. For example, the number of daily and/or monthly views of ads for an item using multiple marketing channels can exceed approximately ten million and/or other suitable numbers, the number of registered users to a retail webpage can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as determining a performance metric of an item using multilayer neural networks does not exist outside the realm of computer networks. Moreover, the techniques described herein can solve a technical problem that cannot be solved outside the context of computer networks.

Various embodiments can include a system including one or more processors and one or more non-transitory computer-readable media storing computing instructions configured to run on the one or more processors and perform certain acts. The acts can include extracting meta features for an item to generate sparse feature embeddings for the item. The acts also can include reducing, using a multilayer perceptron, a dimension of the sparse feature embeddings to generate a representation vector for the meta features. The acts further can include extracting, using a recurrent neural network, sequential data from dense traffic features for the item over a period of time. The acts also can include inputting the representation vector for the meta features and the sequential data from the dense traffic features into a multilayer neural network with a rectified linear unit (ReLU) activation function and a scoring layer to generate one or more performance metrics for the item.

A number of embodiments can include a method being implemented via execution of computing instructions configured to run at one or more processors and stored at one or more non-transitory computer-readable media. The method can include extracting meta features for an item to generate sparse feature embeddings for the item. The method also can include reducing, using a multilayer perceptron, a dimension of the sparse feature embeddings to generate a representation vector for the meta features. The method further can include extracting, using a recurrent neural network, sequential data from dense traffic features for the item over a period of time. The method additionally can include inputting the representation vector for the meta features and the sequential data from the dense traffic features into a multilayer neural network with a rectified linear unit (ReLU) activation function and a scoring layer to generate one or more performance metrics for the item.

Although automatically determining key performance metrics using a multilayer neural network with a rectified linear unit activation for an item has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIGS. 4-5 may include different procedures, processes, and/or activities and be performed by many different modules, in many different orders, and/or one or more of the procedures, processes, or activities of FIGS. 4-5 may include one or more of the procedures, processes, or activities of another different one of FIGS. 4-5. As another example, the systems within prediction model framework 310 (FIG. 3) and webserver 320 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
    one or more processors; and
    one or more non-transitory computer-readable media storing computing instructions that, when executed on the one or more processors, cause the one or more processors to perform functions comprising:
    extracting meta features for an item to generate feature embeddings for the item;
    reducing, using a multilayer perceptron, a dimension of the feature embeddings to generate a representation vector for the meta features;
    extracting, using a recurrent neural network, sequential data from traffic features for the item over a period of time;
    inputting the representation vector for the meta features and the sequential data from the traffic features into a multilayer neural network based on offline learning, wherein input for the multilayer neural network is concatenated and used as input for a first rectified linear unit (ReLU) activation function, wherein an output of the first ReLU activation function is used as a direct input for a second ReLU activation function of the multilayer neural network to output metrics to a first scoring layer, and wherein the first scoring layer generates one or more first performance metrics based on the offline learning for the item;
    re-purposing the metrics output by the second ReLU activation function of the multilayer neural network; and
    feeding the metrics output by the second ReLU activation function and real-time online data into a second scoring layer to generate one or more second performance metrics based on online learning for the item.

2. The system of claim 1, wherein the computing instructions, when executed on the one or more processors, further cause the one or more processors to perform functions comprising:
    generating, by the output of the second ReLU activation function of the multilayer neural network, an embedding vector that represents a combination of respective historical performance data for each meta feature and each traffic feature; and
    storing embedding vectors generated by the metrics output by the second ReLU activation function of the multilayer neural network in a database, wherein the embedding vectors comprise the embedding vector and wherein the database stores at least the embedding vectors generated offline for use by an online service.

3. The system of claim 2, wherein the computing instructions, when executed on the one or more processors, further cause the one or more processors to perform functions comprising:
    retrieving the embedding vectors, as stored; and
    training the first scoring layer based on the offline learning to predict a performance metric for the item, wherein the first scoring layer comprises a machine learning model.

4. The system of claim 3, wherein the machine learning model comprises linear regression.

5. The system of claim 1, wherein extracting the meta features comprises encoding hierarchy information about the item.

6. The system of claim 1, wherein extracting the meta features comprises using an NLP-based embedding algorithm to embed text features about the item, wherein the text features comprise one or more of a title of the item and a description of the item.

7. The system of claim 1, wherein extracting the meta features comprises extracting data from one or more images of the item using a convolutional neural network.

8. The system of claim 1, wherein the one or more first performance metrics further comprise a conversion rate for the item, an order size for the item, and a contributed profit per order for the item.

9. The system of claim 8, wherein the computing instructions, when executed on the one or more processors, further cause the one or more processors to perform a function comprising:
    generating a revenue per click metric for the item based on the conversion rate for the item and the order size for the item.

10. The system of claim 1, wherein the computing instructions, when executed on the one or more processors, further cause the one or more processors to perform functions comprising:
    combining embedding vectors of the offline learning with real-time online data of the online learning for the item to generate inputs for the second scoring layer; and
    generating a contributed profit per click metric based on a conversion rate and a contributed profit per order.

11. A method being implemented via execution of computing instructions configured to run on one or more processors and stored at one or more non-transitory computer-readable media, the method comprising:
    extracting meta features for an item to generate feature embeddings for the item;
    reducing, using a multilayer perceptron, a dimension of the feature embeddings to generate a representation vector for the meta features;
    extracting, using a recurrent neural network, sequential data from traffic features for the item over a period of time;
    inputting the representation vector for the meta features and the sequential data from the traffic features into a multilayer neural network based on offline learning, wherein input for the multilayer neural network is concatenated and used as input for a first rectified linear unit (ReLU) activation function, wherein an output of the first ReLU activation function is used as a direct input for a second ReLU activation function of the multilayer neural network to output metrics to a first scoring layer, and wherein the first scoring layer generates one or more first performance metrics based on the offline learning for the item;
    re-purposing the metrics output by the second ReLU activation function of the multilayer neural network; and
    feeding the metrics output by the second ReLU activation function and real-time online data into a second scoring layer to generate one or more second performance metrics based on online learning for the item.

12. The method of claim 11, further comprising:
generating, by the output of the second ReLU activation function of the multilayer neural network, an embedding vector that represents a combination of respective historical performance data for each meta feature and each traffic feature; and
storing embedding vectors generated by the metrics output by the second ReLU activation function of the multilayer neural network in a database, wherein the embedding vectors comprise the embedding vector and wherein the database stores at least the embedding vectors generated offline for use by an online service.

13. The method of claim 12, further comprising:
retrieving the embedding vectors, as stored; and
training the first scoring layer based on the offline learning to predict a performance metric for the item, wherein the first scoring layer comprises a machine learning model.

14. The method of claim 13, wherein the machine learning model comprises linear regression.

15. The method of claim 11, wherein extracting the meta features comprises encoding hierarchy information about the item.

16. The method of claim 11, wherein extracting the meta features comprises using an NLP-based embedding algorithm to embed text features about the item, wherein the text features comprise one or more of a title of the item and a description of the item.

17. The method of claim 11, wherein extracting the meta features comprises extracting data from one or more images of the item using a convolutional neural network.

18. The method of claim 11, wherein the one or more first performance metrics further comprise a conversion rate for the item, an order size for the item, and a contributed profit per order for the item.

19. The method of claim 18, further comprising:
generating a revenue per click metric for the item based on the conversion rate for the item and the order size for the item.

20. The method of claim 11, further comprising:
combining embedding vectors of the offline learning with real-time online data of the online learning for the item to generate inputs for the second scoring layer; and
generating a contributed profit per click metric based on a conversion rate and a contributed profit per order.

* * * * *